US012286827B2

(12) United States Patent
Salice

(10) Patent No.: US 12,286,827 B2
(45) **Date of Patent: *Apr. 29, 2025**

(54) HINGE FOR FURNITURE WITH DRIVE MEANS FOR A MOVEMENT CONTROL DEVICE

(71) Applicant: ARTURO SALICE S.P.A., Novedrate (IT)

(72) Inventor: Sergio Salice, Carimate (IT)

(73) Assignee: ARTURO SALICE S.P.A., Novedrate (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/025,610

(22) PCT Filed: Nov. 5, 2021

(86) PCT No.: PCT/EP2021/080753

§ 371 (c)(1),
(2) Date: Mar. 9, 2023

(87) PCT Pub. No.: WO2022/106219

PCT Pub. Date: May 27, 2022

(65) Prior Publication Data

US 2023/0340822 A1 Oct. 26, 2023

(30) Foreign Application Priority Data

Nov. 20, 2020 (IT) ........................ 102020000027933

(51) Int. Cl.
*E05F 1/08* (2006.01)
*E05F 1/12* (2006.01)
*E05F 5/00* (2017.01)

(52) U.S. Cl.
CPC ................ *E05F 1/12* (2013.01); *E05F 5/006* (2013.01); *E05Y 2900/20* (2013.01)

(58) Field of Classification Search
CPC ... E05F 1/08; E05F 1/10; E05F 1/1041; E05F 1/1091; E05F 1/12; E05F 1/1223;
(Continued)

(56) References Cited

U.S. PATENT DOCUMENTS 8,561,262 B1 10/2013 Liang
8,650,711 B1 2/2014 Chen
(Continued)

FOREIGN PATENT DOCUMENTS

AT 6499 11/2003
AU 2007291476 4/2009
(Continued)

OTHER PUBLICATIONS

International Search Report of PCT Application No. PCT/EP2021/080753, Issued Feb. 11, 2022.
(Continued)

*Primary Examiner* — Chuck Y Mah
(74) *Attorney, Agent, or Firm* — Ferguson Case Orr Paterson

(57) ABSTRACT

The hinge (1) for furniture comprises a substantially flat-shaped fixed part (2) conformed to be inserted in a seat (3) within the thickness of a horizontal wall (4) of the piece of furniture, and a movable part (5) connectable to a door (7); the hinge (1) comprises a movement control device (25, 32, 39, 43, 47, 55) within said fixed part (2) or movable part (5) of the hinge for controlling the closing/opening movement of the hinge (1) and a drive member (26, 33, 40, 44, 48, 56) for the movement control device (25, 32, 39, 43, 48, 55), movably supported by the other of fixed part (2) and movable part (5) of the hinge and operatively connected with the same hinge part (2, 5), said drive member (26, 33,
(Continued)

56) cooperating with the movement control device (25, 32, 55) independently from the articulation device (11-14, 54) of the hinge.

14 Claims, 15 Drawing Sheets

(58) Field of Classification Search
CPC ..... E05F 1/1246; E05F 1/1253; E05F 1/1261; E05F 1/1292; E05F 1/14; E05F 5/006; E05F 3/20; E05F 3/18; E05D 11/1021; E05D 3/12; E05D 3/14; E05D 3/16; E05D 11/10; E05D 15/40; E05D 15/401; E05D 15/405; E05D 15/406; E05D 15/42; E05D 15/58; E05D 15/565; E05D 3/142; E06B 3/5045; E05Y 2800/22; E05Y 2900/20; E05Y 2900/202; E05Y 2900/208; E05Y 2900/21; E05Y 2201/21; E05Y 2201/264; E05Y 2201/212; E05Y 2201/604; E05Y 2600/41
See application file for complete search history.

(56) References Cited

U.S. PATENT DOCUMENTS

| | | | | |
|---|---|---|---|---|
| 9,163,447 | B1 | 10/2015 | Liang | |
| 9,874,049 | B1 | 1/2018 | McGregor | |
| 10,295,194 | B2 | 5/2019 | Sirlouis | |
| 10,428,896 | B2 | 10/2019 | Zimmer | |
| 11,078,705 | B2 | 8/2021 | Salice | |
| 11,306,527 | B2 | 4/2022 | Folie | |
| 11,486,176 | B2 | 11/2022 | Duer | |
| 11,603,687 | B2 | 3/2023 | Giovannetti | |
| 11,753,857 | B2 | 9/2023 | Giovannetti | |
| 12,012,792 | B2 | 6/2024 | Schneider | |
| 2003/0200625 | A1 | 10/2003 | Zimmer | |
| 2004/0040118 | A1 | 3/2004 | Han | |
| 2005/0211239 | A1 | 9/2005 | Jung | |
| 2011/0291538 | A1 | 12/2011 | Brunnmayr | |
| 2012/0174338 | A1 | 7/2012 | Wu | |
| 2014/0366322 | A1 | 12/2014 | Salice | |
| 2017/0110774 | A1 | 4/2017 | McGregor | |
| 2018/0355651 | A1 | 12/2018 | Liang | |
| 2019/0242167 | A1* | 8/2019 | Salice | E05F 1/1058 |
| 2019/0309554 | A1* | 10/2019 | Schärer | E05F 3/20 |
| 2021/0032919 | A1 | 2/2021 | Peer | |
| 2021/0148149 | A1 | 5/2021 | Pleuteri | |
| 2021/0189780 | A1* | 6/2021 | Nordieker | E05D 7/0415 |
| 2021/0404230 | A1* | 12/2021 | Giovannetti | E05F 1/1058 |
| 2022/0195768 | A1* | 6/2022 | Schneider | E05F 5/006 |
| 2022/0195776 | A1* | 6/2022 | Giovannetti | E05F 3/20 |
| 2022/0275671 | A1 | 9/2022 | Salice | |
| 2023/0272655 | A1* | 8/2023 | Baldreich | E05F 1/1276 49/381 |
| 2023/0340822 | A1 | 10/2023 | Salice | |
| 2023/0349216 | A1 | 11/2023 | Salice | |

FOREIGN PATENT DOCUMENTS

| | | | | |
|---|---|---|---|---|
| CA | 3058692 | | | 10/2018 |
| CN | 208056889 | U | * | 11/2018 |
| CN | 109267869 | | | 1/2019 |
| CN | 209817699 | | | 12/2019 |
| DE | 10227078 | | | 5/2004 |
| EP | 2278104 | | | 1/2011 |
| EP | 3575532 | | | 12/2019 |
| IT | 1399122 | | | 4/2013 |
| JP | 2020523508 | A | * | 8/2020 |
| KR | 20110053602 | | | 5/2011 |
| TW | 200825265 | | | 6/2008 |
| WO | 2016174071 | | | 11/2016 |
| WO | 2018224505 | | | 12/2018 |
| WO | 2019091967 | | | 5/2019 |
| WO | 2019206578 | | | 10/2019 |
| WO | WO2020089040 | | | 5/2020 |
| WO | 2020212086 | | | 10/2020 |
| WO | 2021173090 | | | 9/2021 |

OTHER PUBLICATIONS

International Written Opinion of PCT Application No. PCT/EP2021/080753, Issued Feb. 11, 2022.
Office Action issued in U.S. Appl. No. 18/112,248; mailed Mar. 27, 2023.
Office Action issued in U.S. Appl. No. 18/025,615 issued Sep. 27, 2024.
Office Action issued in U.S. Appl. No. 18/025,615 mailing date Jan. 29, 2025.
Taiwanese Office Action issued in Taiwanese Application No. 110138705 dated Jan. 23, 2025.
Office Action issued in U.S. Appl. No. 18/025,617 dated Feb. 10, 2025.

* cited by examiner

HINGE FOR FURNITURE WITH DRIVE MEANS FOR A MOVEMENT CONTROL DEVICE

BACKGROUND OF THE INVENTION

Field of the Invention

The invention relates to an invisible hinge for furniture doors or the like, in particular a hinge having a fixed part or wing conformed to be inserted in a seat provided within the thickness of a substantially horizontal wall of the piece of furniture.

Description of Related Art

In the furniture sector, in order to support the furniture doors in an oscillating way, hinges are generally used comprising a fixed part or wing that can be connected to the furniture body and a movable part consisting of a box-like body, connectable to the door, which parts are articulated to each other in an oscillating way through at least one axis of rotation and more preferentially through an articulation system comprising articulation axes and connecting rockers.

In order to bring and keep the door in the closed position, the hinges also include suitable elastic means designed to urge the hinge itself in the closing direction.

Due to the presence of these elastic means, the door, in correspondence of the closing position, hits the body of the piece of furniture, causing unwanted noise.

In order to overcome this problem, the adoption of a deceleration device, for example linear or rotary type, has been proposed variously, associated with one of the parts of the hinge to dampen the closing movement of the hinge itself.

As part of the continuous evolution of furniture design, totally invisible hinges have been proposed, in which the fixed part has a flat conformation to be inserted in a seat obtained in the thickness of the upper or lower wall of the piece of furniture and in which the rockers are also flat and extend according to the plane in which the fixed part lies.

To decelerate this type of totally invisible hinges, for example, it has been proposed to provide a deceleration device mounted externally on an extension of the fixed part of the hinge, which device has an actuation portion protruding on a front side of the piece of furniture, for example a tip connected to the shock absorber rod, to be operated directly by the movable part of the hinge; however this solution, in addition to having greater overall dimensions of the fixed part of the hinge due to the presence of the external shock absorber, has a poor functioning since the movable part of the hinge comes into contact with the actuation portion of the decelerator only in the last degrees of the closing movement and therefore it is not able to effectively decelerate the closing movement of the door.

To overcome these problems, a different solution was proposed in WO 2016174071 in which the deceleration device is housed inside the fixed part of the hinge and is operated by one of the two rockers, directly or indirectly through a transmission mechanism.

However, this type of solution involves constraints in the shape of the rockers which may entail limitations in the opening movement of the hinge.

Furthermore, this solution is not applicable if the hinge does not include rockers, for example in hinges having one articulation axis as the only means of connection between the fixed part and the movable part of the hinge.

These problems are also present if the hinges, instead of the deceleration device, are equipped with elastic means for opening the door for use in furniture without handles; in fact, even in such known hinges the elastic opening means are operated directly or indirectly by the rockers of the hinge.

BRIEF SUMMARY OF THE INVENTION

The object of the present invention is therefore to provide an invisible hinge for furniture doors or the like, of the kind having a fixed part or wing shaped to be inserted into a seat formed in the thickness of a substantially horizontal wall of the furniture, which has a deceleration device or elastic opening means which can be operated in a simple and versatile way without the intervention of any hinge articulation rocker, and which in any case have an effective operation.

In accordance with a different and general embodiment, the above can be achieved by means of a hinge for furniture doors comprising a fixed part with an essentially flat shape conformed to be insertable into a seat formed in the thickness of a horizontal wall of the furniture and open on a front side of the wall itself, and a movable part that can be connected to a door, the fixed part and the movable part being connected to each other swingably by means of an articulation device comprising at least one articulation axis, the hinge also comprising a movement control device to control the closing/opening movement of the hinge and a drive member for the movement control device, said movement control device being in particular in the form of a deceleration device to decelerate the closing and/or opening movement of the hinge or of an elastic device to open the hinge, characterized in that the movement control device is completely internally placed in one of said fixed part and said movable part of the hinge, and in that said drive member is supported in a movable way by one of said fixed part and said movable part of the hinge and is operatively connected or operable from the hinge part itself or from the other between said fixed part and said movable part of the hinge, said drive member cooperating with the movement control device independently from said articulation device.

The features of the present invention are specifically defined in the claims.

BRIEF DESCRIPTION OF THE FIGURES

Furthermore, the characteristics and advantages of the present invention will become more evident from the following description of some preferential but not limiting embodiments of the furniture hinge, with reference to the attached figures, in which.

DETAILED DESCRIPTION

Figure 1:
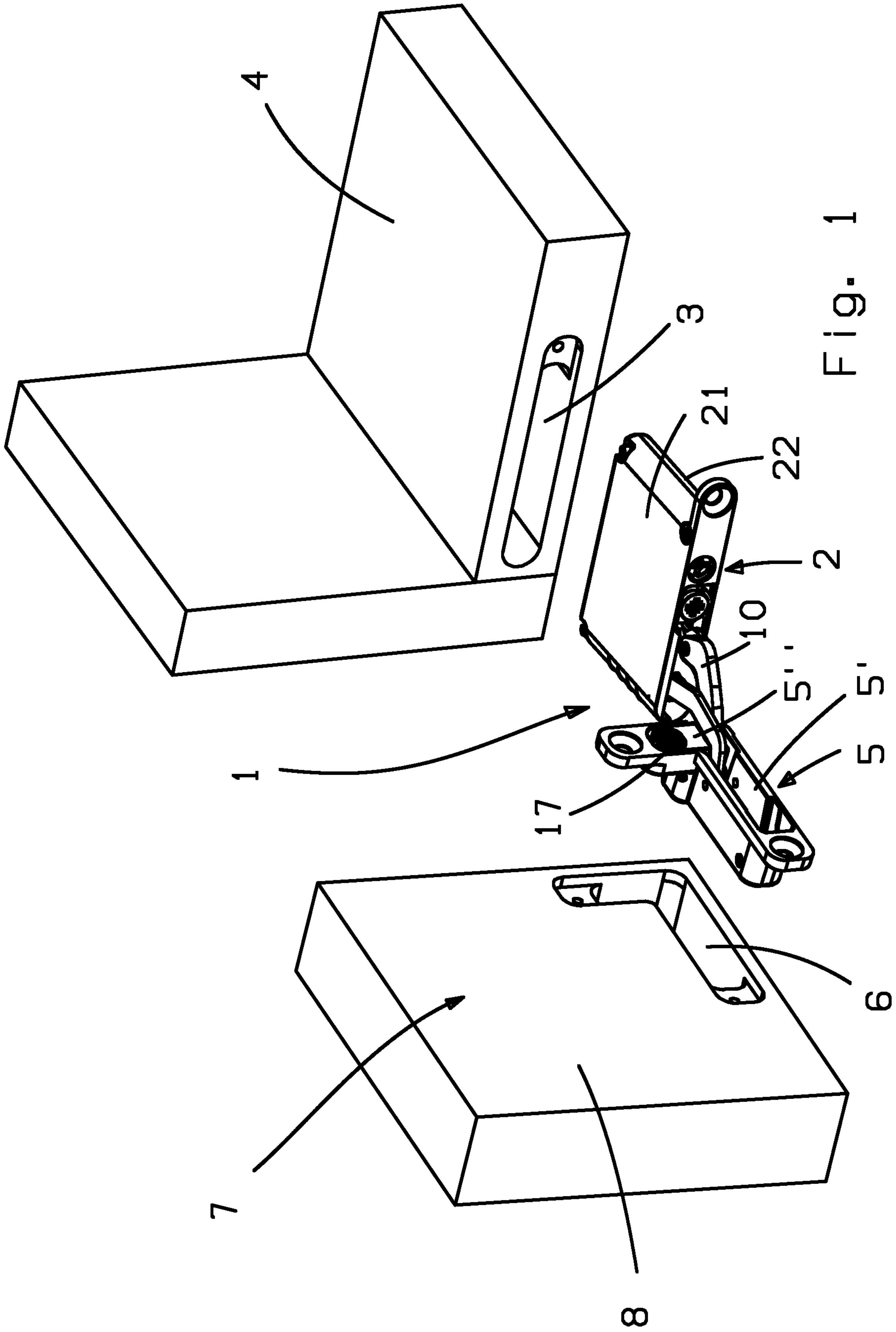
FIG. 1 is a perspective view of a hinge according to a first embodiment, in which the body of the piece of furniture and the door provided with the respective seats for the insertion of the fixed and movable parts of the hinge have been schematically illustrated.
Figure 2:
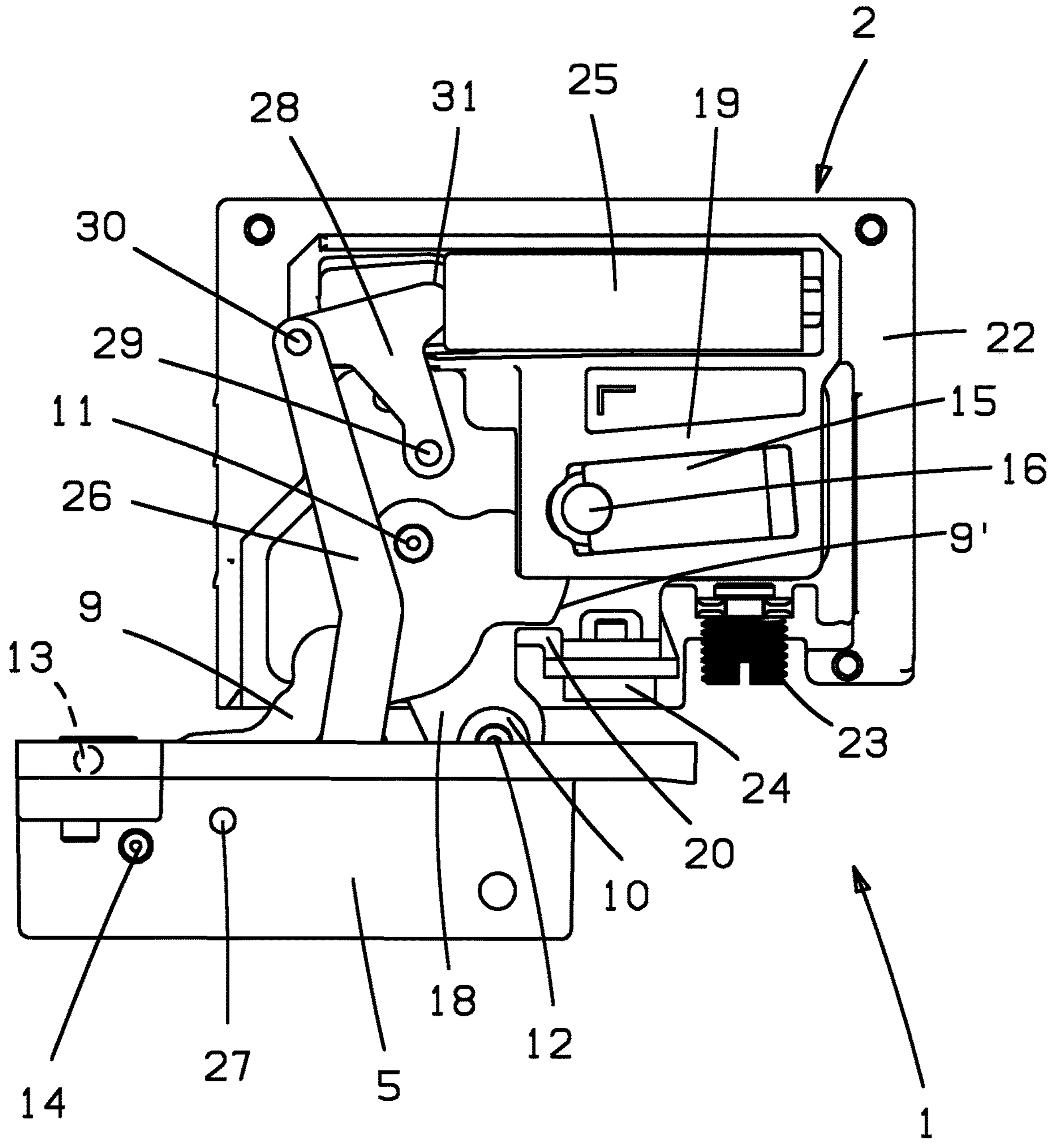
FIG. 2 is a top view of the hinge of FIG. 1 in the closed position, in which for illustrative purposes the fixed part has been opened at the top.
Figure 3:
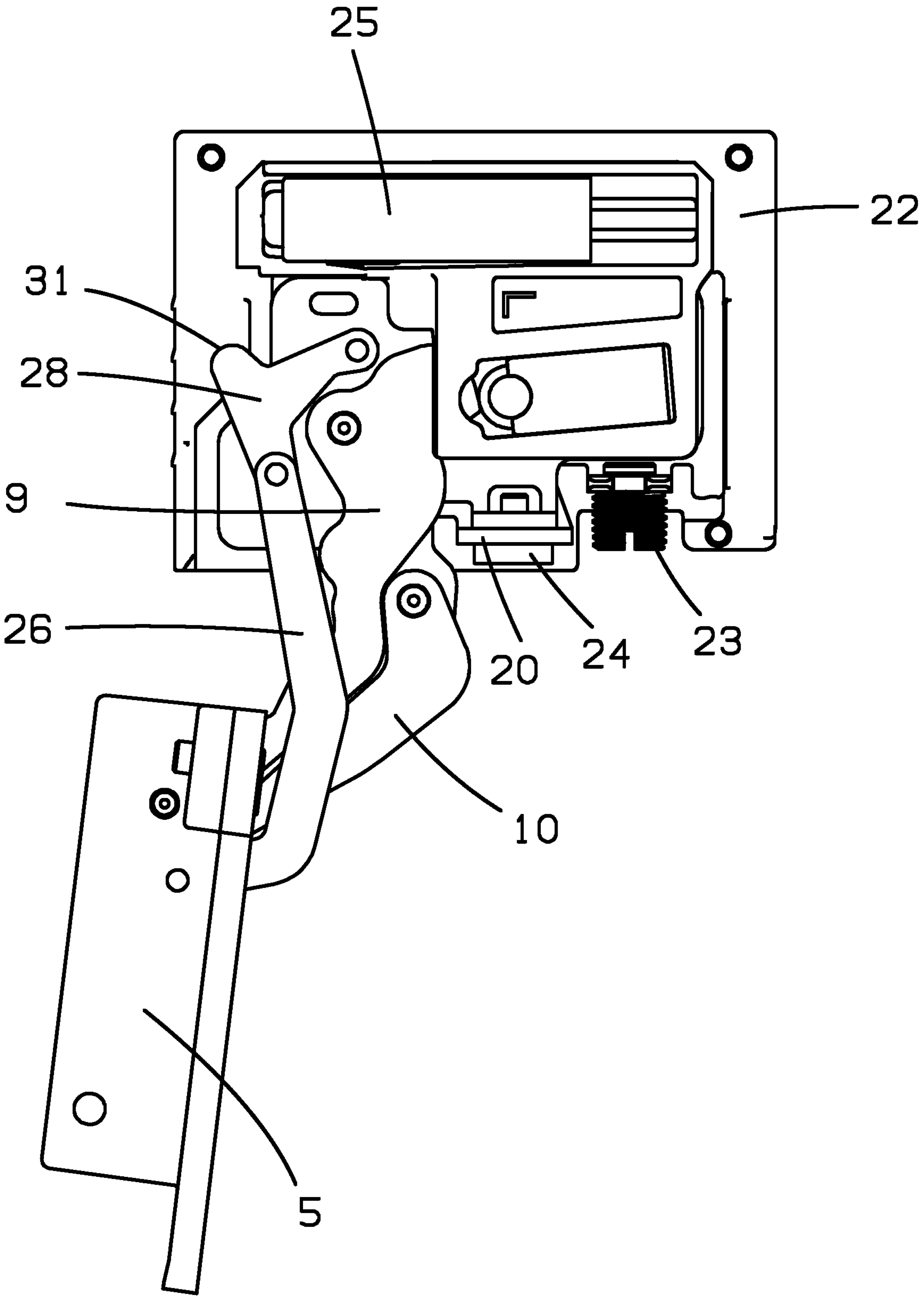
FIG. 3 is the view of FIG. 2 with the hinge in the open position.

FIGS. 1 to 3 illustrate a hinge for furniture or the like according to a first embodiment, indicated as a whole with the reference number 1, which comprises a fixed part or wing 2 shaped to be inserted in a seat 3 which is provided in the thickness of a substantially horizontal wall of a piece of furniture, for example in the upper or lower wall 4 of a piece of furniture and which opens on a front side of the wall itself, and a movable hinge part 5 shaped to be inserted in a seat 6 defined in a door 7 of the piece of furniture or alternatively shaped to be fixed to a surface 8 of the door 7 itself.

Figure 13:
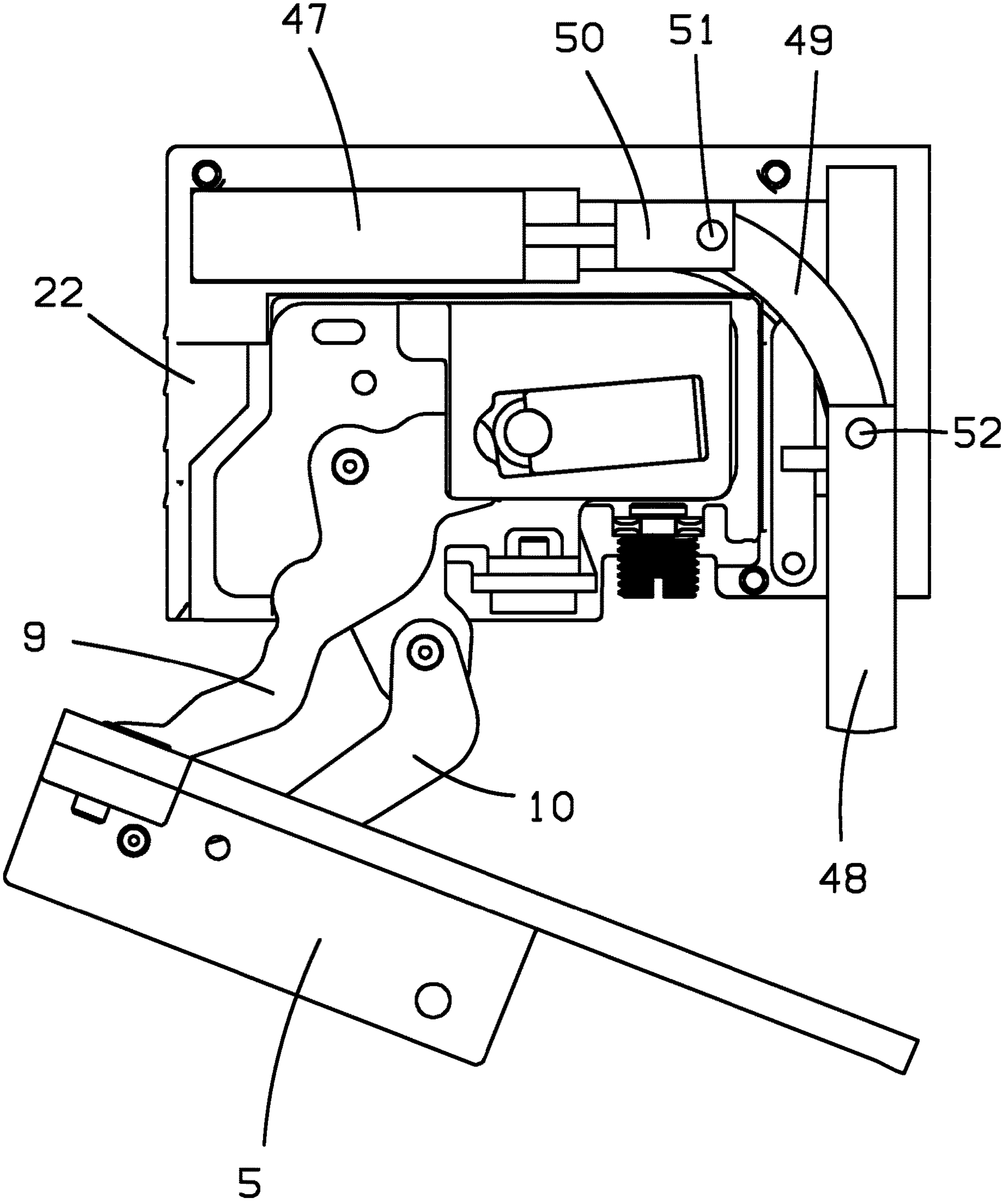
FIG. 13 is the view of FIG. 12 with the hinge in the open position.
Figure 14:
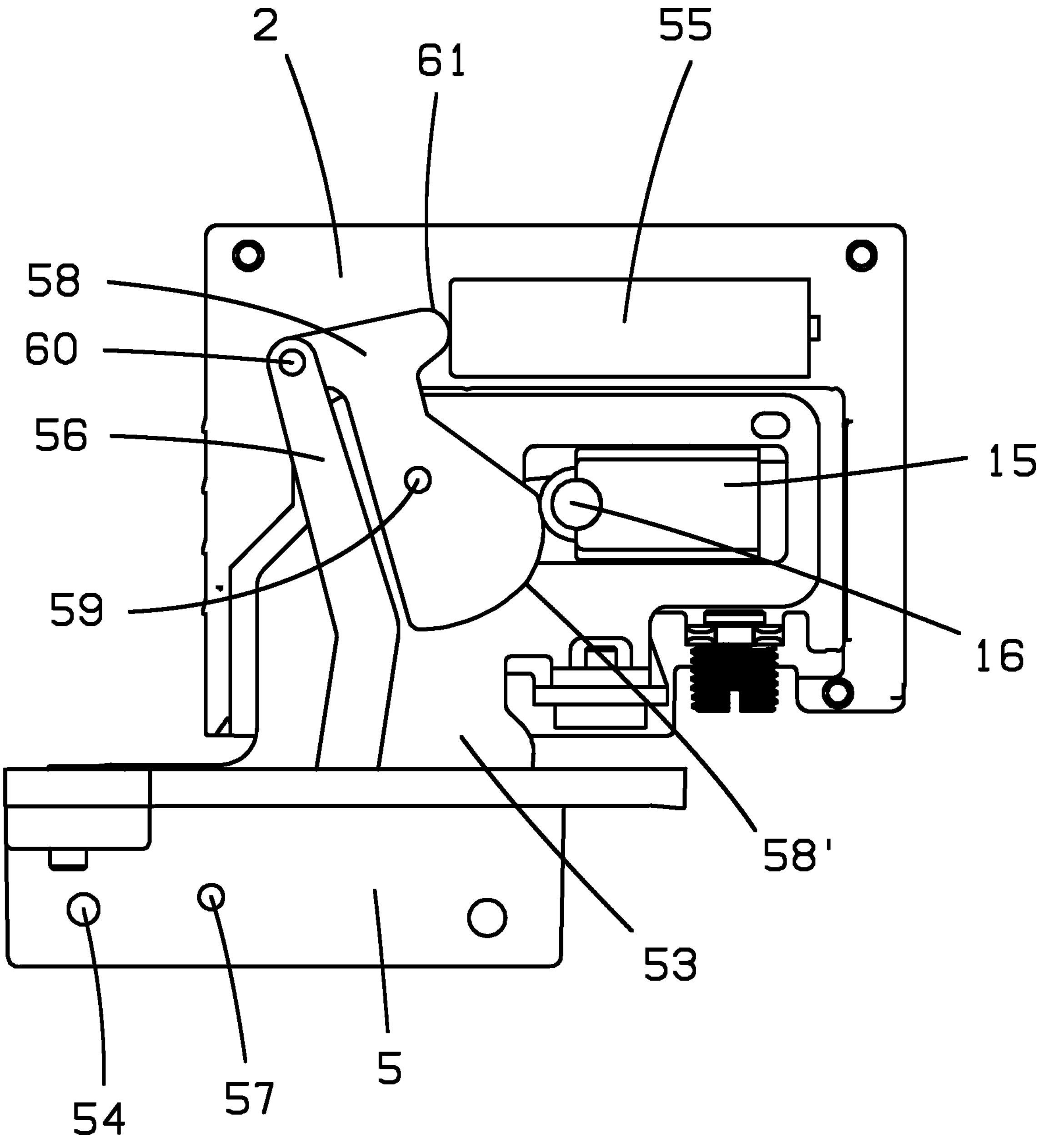
FIG. 14 is a top view of a hinge according to a sixth embodiment, in the closed position, in which for illustrative purposes the fixed part has been opened at the top.
Figure 15:
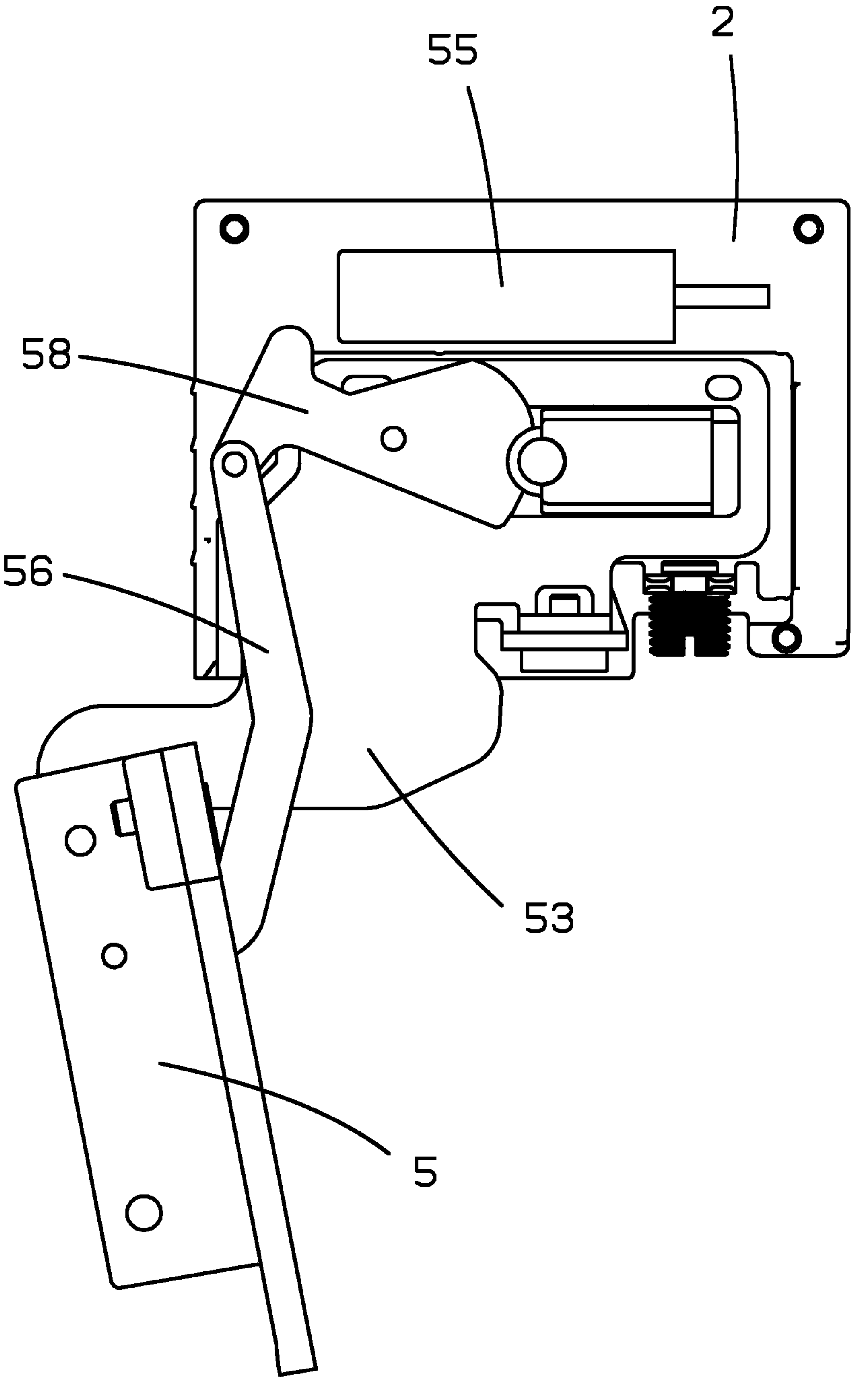
FIG. 15 is the view of FIG. 14 with the hinge in the open position.

The hinge also comprises an articulation device for pivotally connecting the fixed part 2 with the movable part 5 of the hinge; the articulation device can comprise a single articulation axis, as illustrated for example in the embodiment of FIGS. 14 and 15, or more preferentially it can comprise an articulation system having at least one rocker and a plurality of articulation axes, as illustrated for example in FIGS. 1 to 13.

In the preferred embodiments of FIGS. 1 to 13, the articulation system comprises a first 9 and a second 10 rocker and four articulation axes 11, 12, 13, 14 adapted to define an articulated quadrilateral system to allow articulation of the movable part 5 with respect to the fixed part 2 of the hinge. 20

For the purpose of insertion into the seat 3 obtained in the upper or lower wall 4 of the piece of furniture, the fixed part 2 of the hinge suitably has a flat conformation which preferentially extends along a plane orthogonal to the axis or axes of articulation 11-14 of the system of articulation; in turn, the rockers 9, 10 also have a flat conformation or with a flattened U-shaped section or in any case with a reduced extension in the direction of the articulation axes 11-14 and preferentially extend along a plane orthogonal to the articulation axes 11-14, parallel or coincident with the plane according to which the flat fixed part 2 of the hinge extends, so as to be able to be housed at least partially in the fixed part 2 itself.

Thanks to this conformation, the hinge is completely concealed and the only parts of the hinge that protrude from the seats 3 and 6 for inserting the parts 2 and 5 of the hinge are the rockers 9 and 10, which remain visible when the door of the cabinet is open.

The hinge also comprises elastic means to close the hinge, acting between the fixed part 2 and the movable part 5 of the hinge, for example operatively connected to one of the rockers 9, 10 of the articulation system; such elastic closing means are not provided in the case where the hinge is configured for application on furniture with doors without handles, as explained below.

In the case of the embodiment illustrated in FIGS. 1 to 3, the elastic means comprise at least one spring of the helical type, not visible in the figures, or of another suitable type, which urges a thrust member 15 slidably arranged in a seat of the fixed part 2, which thrust member 15 rotatably supports a roller 16 arranged to act on a lateral contact surface or cam 9' of the rocker 9 in such a way as to generate a torque on the rocker 9 itself such as to stress the hinge towards the closed position.

Preferably, the hinge further comprises adjustment means to adjust the relative position between the fixed part 2 and the movable part 5 of the hinge in at least one of the lateral, front and vertical directions.

For example, to achieve adjustment in the vertical direction of the hinge and therefore of the door 7, the movable part 5 preferably comprises a first box-shaped part 5' that can be fixed to the door 7, a second part 5" connected to the first part 5' slidably in the vertical direction and an eccentric adjustment member 17 which allows to define the relative position between the parts 5', 5".

In order to achieve the other adjustments, the rockers 9, 10 are preferably connected to at least one support element arranged in a movable and adjustable way in the fixed part 2, for example to a first flat element or plate 18 by means of the respective rotation axes 11, 13, which element 18 also carries a support body 19 in which the housing seat for the elastic closing means is defined.

The flat element 18 and the support body 19 are movably supported in the lateral direction by a second lower flat element 20 which in turn is movably housed in the frontal direction in the fixed part 2.

The fixed part 2 preferably has a box-shaped body which can be made in a single piece with one or more openings on one or more sides or more preferentially made of several parts, for example consisting of a half-shell or upper casing 21 and a half-shell or lower casing 22.

In order to define the adjustment positions between the aforementioned parts, front adjustment means 23 are provided, preferably of the screw type, to define the position of the flat element 18 with respect to the upper casing 21 or lower casing 22, as well as lateral adjustment means 24, preferably of the eccentric type, are provided to define the position in the lateral direction of the flat element 18 with respect to the flat element 20.

The adjustment means 17, 23, 24 conveniently comprise maneuverable control means, for example in the form of screw-type notches, and are accessible to the user from the front side of the furniture in which the hinge is mounted to allow easy adjustment.

The hinge 1 further comprises at least one device to control the closing/opening movement of the hinge, which in the illustrated embodiment is in the form of a damping device to decelerate at least a part of the closing and/or opening movement of the hinge, and it also comprises a drive member to control the movement control device.

According to the present invention, the movement control device is completely internally arranged in one of the fixed part 2 and the movable part of the hinge, and the drive member is supported in a movable way by one of the fixed part and the movable part of the hinge and is operatively connected or operable from the hinge part itself or from the other hinge part in such a way as to cooperate with the movement control device independently from the articulation device.

In the embodiment illustrated in FIGS. 1 to 3, a damping device 25 is in particular provided in the fixed part 2 of the hinge, as well as a drive member 26 supported in an oscillating way by the movable part 5 of the hinge and operatively connected to the movable part 5 itself by means of a pivot 27.

However, an inverse arrangement of the elements is not excluded, in particular that the damping device can be arranged in the movable part of the hinge, and that the drive member is supported swingably by the fixed part of the hinge and operatively connected to the fixed part itself.

Preferably, the damping device 25 is in the form of a linear oil damper, however the possibility of using another type of damper, for example with air or grease, or having a different movement, for example rotary, is not excluded.

The linear damper 25 is for example arranged at a rear side of the fixed part 2, parallel to a front surface of the fixed part 2 itself; however, a different positioning of the damper in the fixed part 2 of the hinge is not excluded.

The drive member 26 is preferably in the form of a lever 26, which, as mentioned, is connected swingably to the movable part 5 of the hinge, which can be operatively connected with the movement control device 25 or act on it directly or indirectly through at least one intermediate transmission element.

The direct connection or actuation of the movement control device 25 can take place, for example, by providing for the control lever 26 to penetrate in a guided manner into the fixed part 2 of the hinge to act on the movement control device by means of an end or a wedge-shaped portion of the lever 26 itself.

In the embodiment of FIGS. 1-3, on the other hand, an indirect connection or actuation by means of at least one intermediate transmission element, is illustrated; in particular, an intermediate transmission element is provided in the form of a transmission lever 28 supported swingably in the fixed part 2 of the hinge, for example connected to the flat element 18 by means of a pivot 29, and connected to the control lever 26 by means of a pivot 30.

The transmission lever 28 has a thrust surface or cam 31 intended to come into contact with one end of the cylinder of the damper 25 or with the actuating rod of the same in order to compress the damper during at least part of the closing movement and/or opening of the hinge; for example in the case of the illustrated embodiment, when the door 7 is closed, the control lever 26, which as mentioned is connected to the movable part 5 of the hinge, causes a rotation of the transmission lever 28 in such a way as to compress the damper at least during the terminal part of the closing movement.

In this way the control means for the damper are released and independent from the articulation device and it is therefore possible to freely configure and/or articulate the rockers when provided or to configure the hinge with a single articulation axis.

Figure 4:
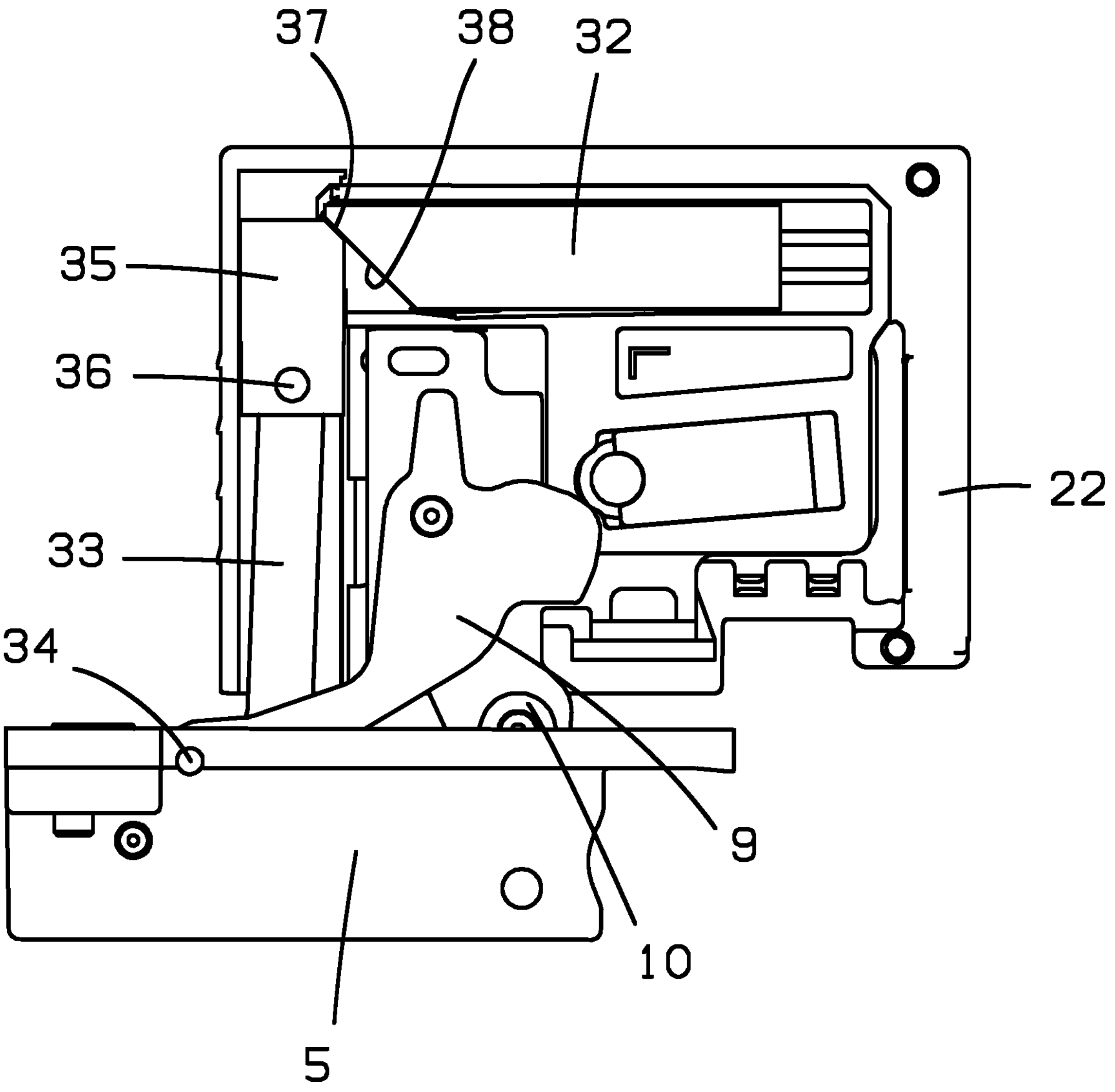
FIG. 4 is a top view of a hinge according to a second embodiment, in the closed position, in which for illustrative purposes the fixed part has been opened at the top.
Figure 5:
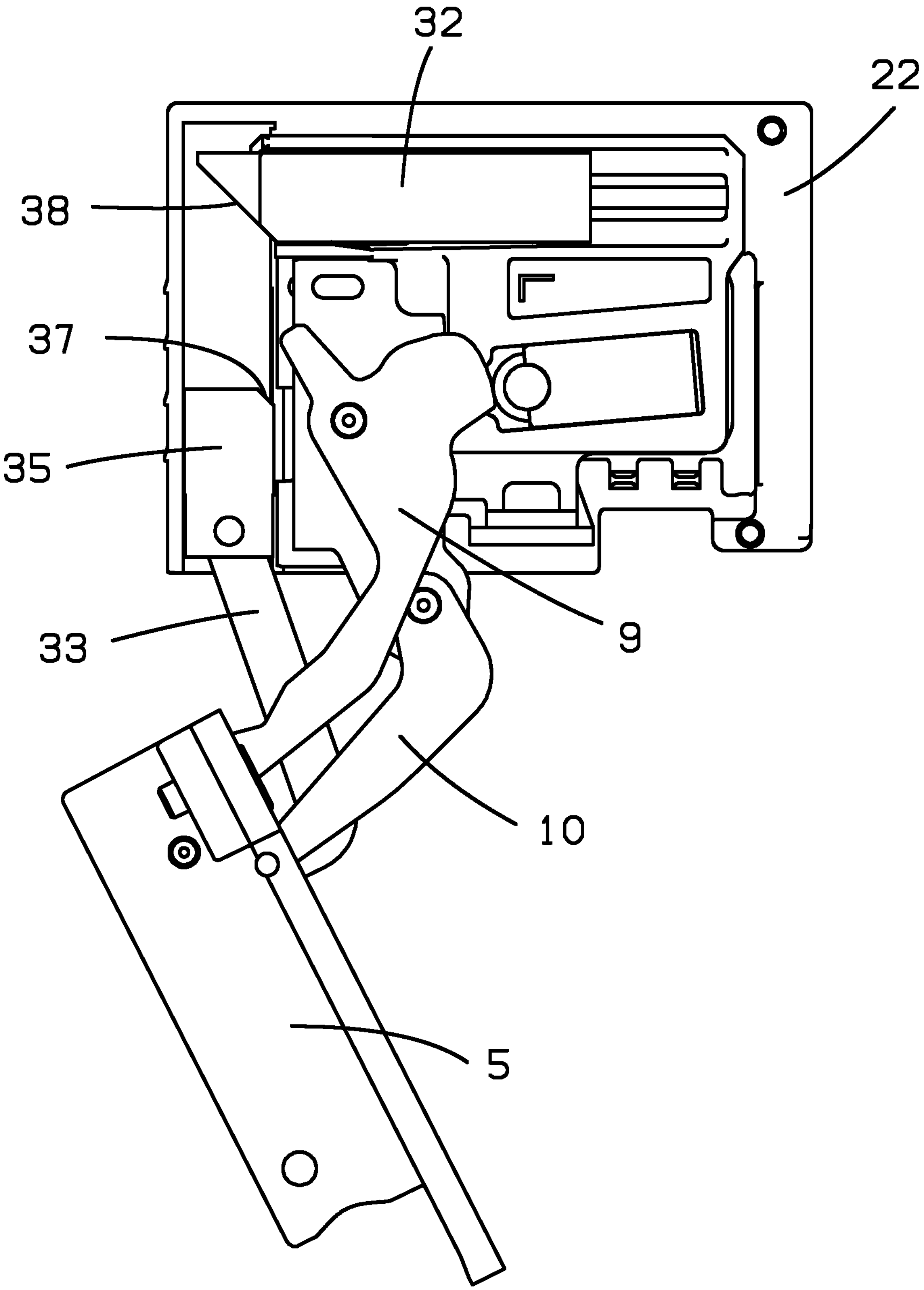
FIG. 5 is the view of FIG. 4 with the hinge in the open position.

FIGS. 4 and 5 show a second embodiment, in which the same reference numbers as the first embodiment have been used to indicate similar or equivalent parts.

Also in this embodiment there is a damping device 32 arranged in the fixed part 2 of the hinge, as well as a drive member 33 supported in a movable way by the movable part 5 and operatively connected to the movable part 5 itself by means of a pivot 34; however, an inverse arrangement of the elements is not excluded, in particular that the damping device can be arranged in the movable part of the hinge, and that the drive member is supported swingably by the fixed part of the hinge and operatively connected to the fixed part itself.

The drive member 33, in the form of a lever, is operatively connected to the movement control device 32 or acts on it indirectly through at least one intermediate transmission element.

The intermediate transmission element is in the form of a slider 35 sliding in the fixed part 2 of the hinge, for example along one side of the same, and connected to the control lever 33 by means of a pivot 36; the slider 35 is shaped and arranged to act on the damper so as to compress it along at least part of the closing and/or opening movement of the hinge.

Preferably the slider 35 comprises a thrust surface 37 shaped to act against a contact surface 38 of the damper; in the case illustrated, the damper 32 and the slider 35 are arranged and movable orthogonally to each other, and one or both of the thrust 37 and contact 38 surfaces are inclined and/or wedge-shaped.

However, a different positioning and a different reciprocal movement between the damper and the drive member with the slider is not excluded.

Figure 6:
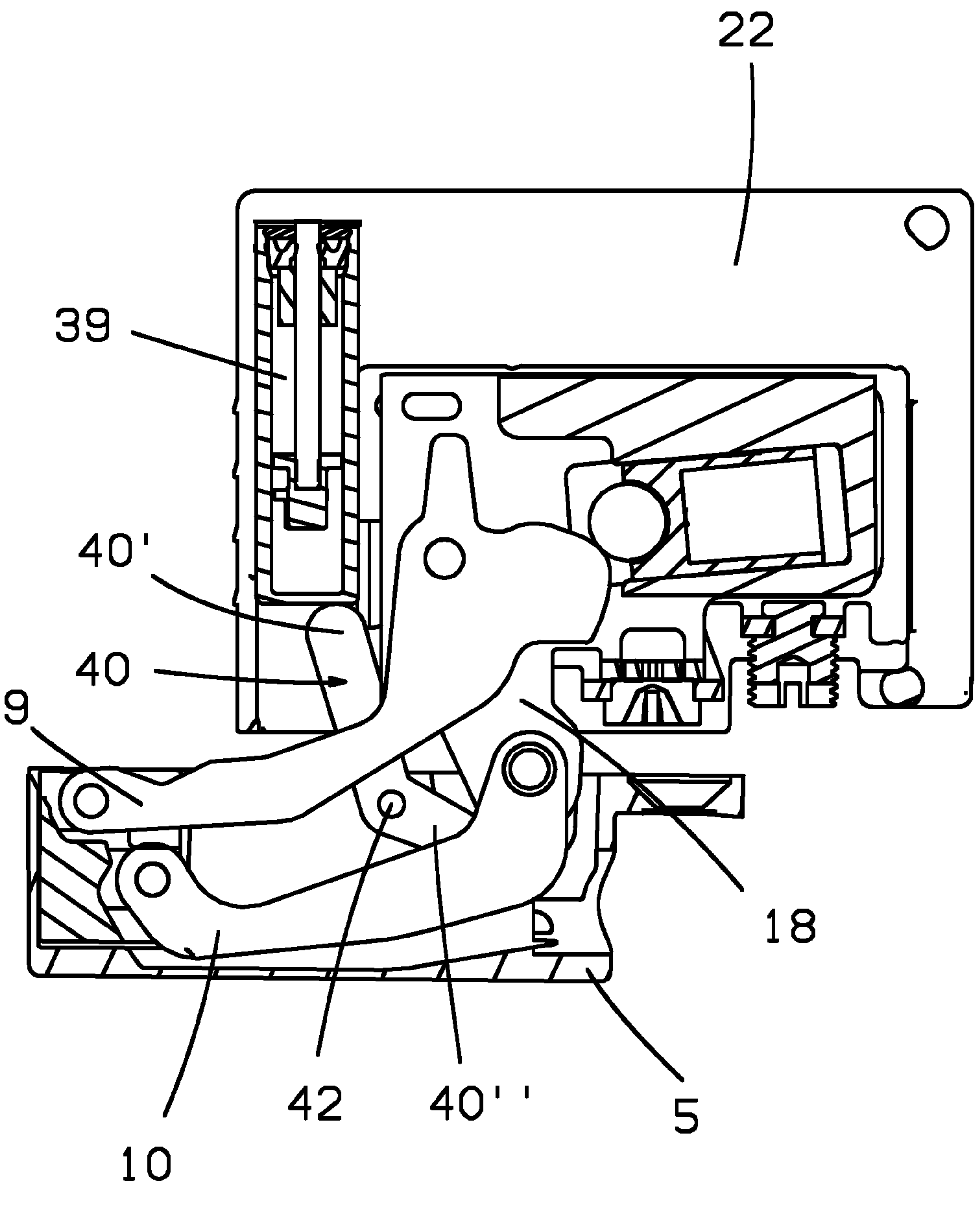
FIG. 6 is a partially sectioned top view of a hinge according to a third embodiment, in the closed position, in which for illustrative purposes the fixed part has been opened at the top.
Figure 7:
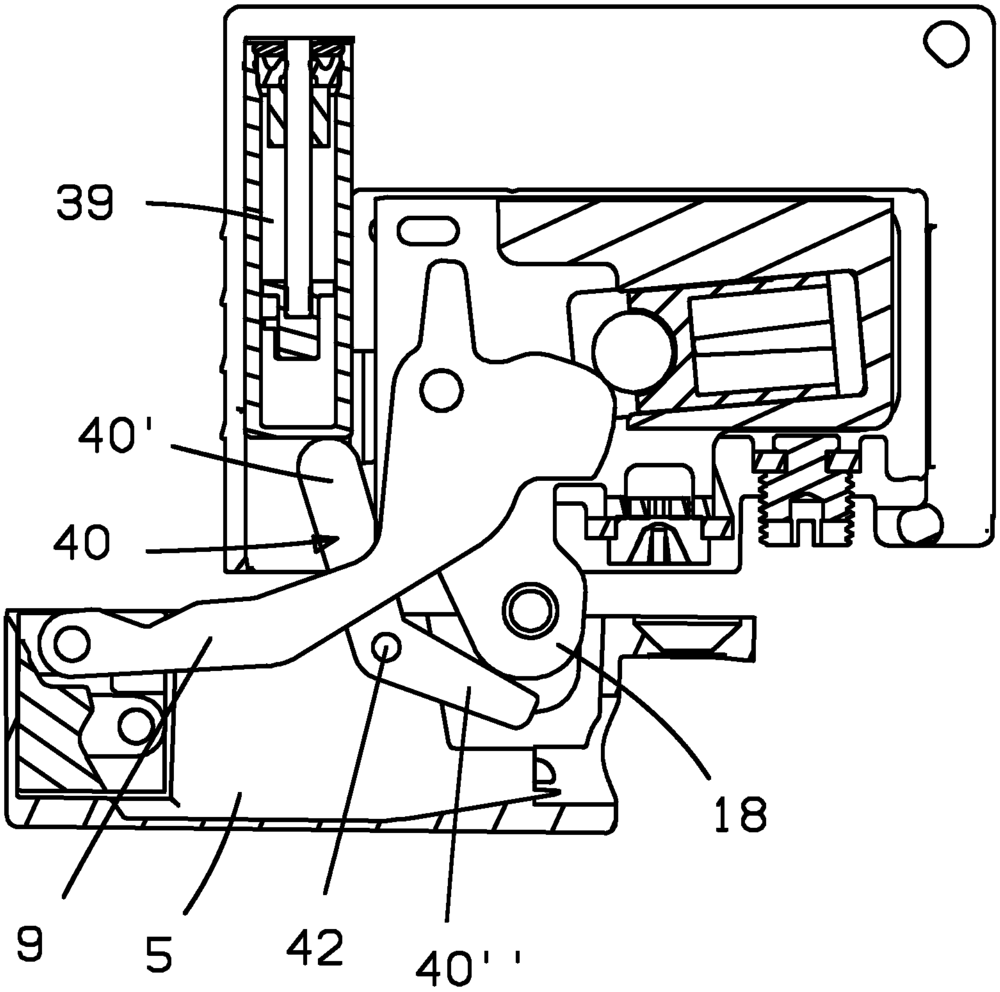
FIG. 7 is the view of FIG. 6 with one of the rockers removed for illustrative purposes.
Figure 8:
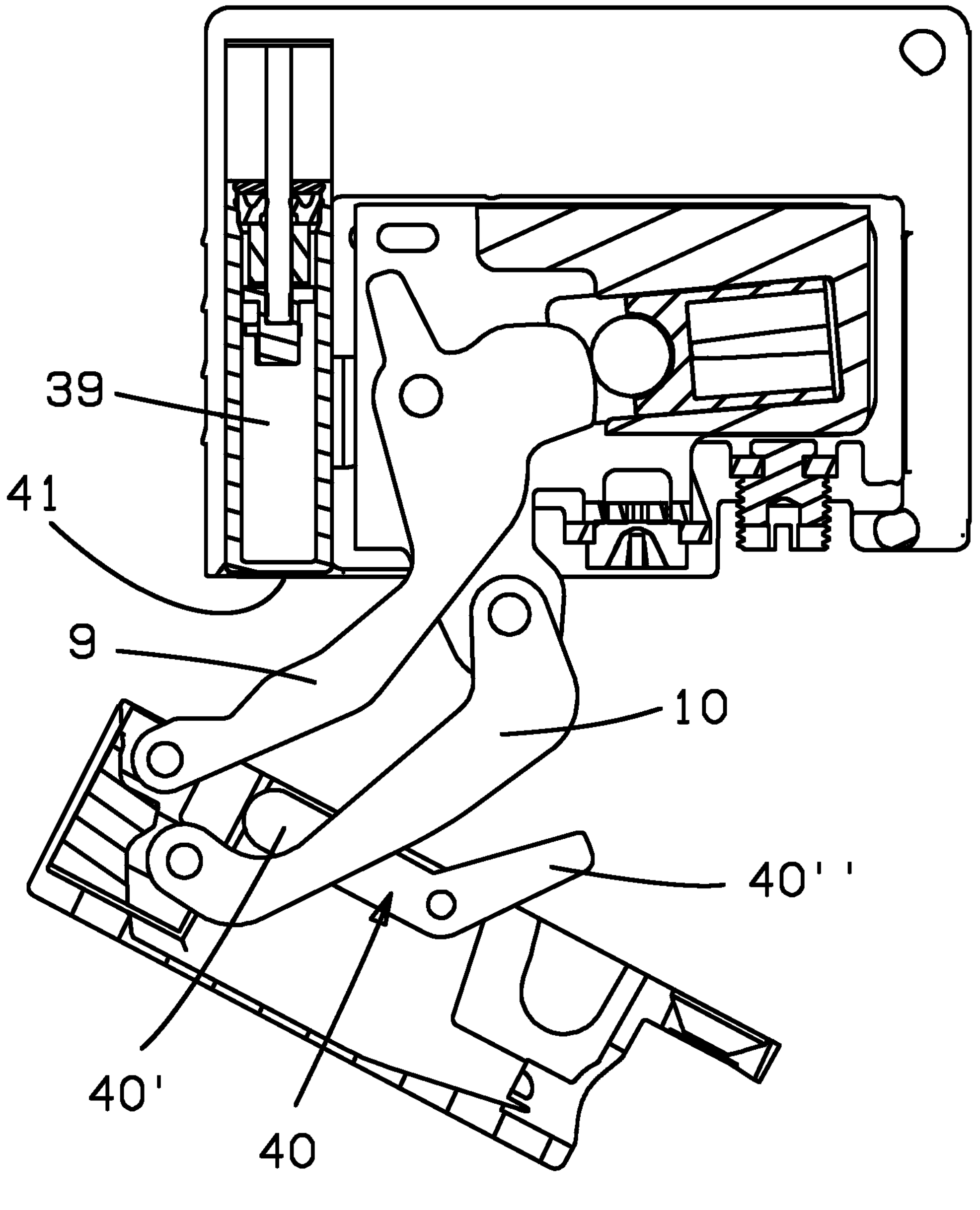
FIG. 8 is the view of FIG. 6 with the hinge in the open position.

FIGS. 6 to 8 illustrate a third embodiment, in which the same reference numbers of the first embodiment have been used to indicate similar or equivalent parts.

In this embodiment, a damping device 39 is provided in the fixed part 2 of the hinge, while a drive member 40 is provided and movably supported in the movable part 5 of the hinge and operatively connected to or operable by the fixed part 2 of the hinge; however, an inverse arrangement of the elements is not excluded, in particular that the damping device can be arranged in the movable part of the hinge, and that the drive member is supported swingably by the fixed part of the hinge and operatively connected to or operable by the movable part 5 of the hinge.

In particular, the damper 39 is preferentially arranged parallel to one side of the fixed part 2 so that, in correspondence with the opening position of the hinge, one end of the damper 39 or a contact surface 41 thereof is flush with the front surface of the fixed part 2 or arranged in any case to be accessible for operation, as illustrated in FIG. 8.

The drive member 40 is preferably in the form of a lever connected swingably in the movable part 5 of the hinge by means of a pivot 42 and having a first arm 40' intended to come into contact with the end surface 41 of the damper 39 and a second arm 40" intended to come into contact with a portion of the fixed part 2, for example a protruding portion of the flat element 18 supporting the rockers 9, 10, during at least part of the closing and/or opening movement of the hinge, for example along an arc of the movement at the closed position, so as to operate the damper to dampen the closing movement of the hinge.

However, a different positioning and a different reciprocal movement between the damper 39 and the control lever 40 is not excluded.

In addition, the control unit can be operationally connected to the movement control device or act on it directly, as in the example, or indirectly through at least one intermediate transmission element.

Figure 9:
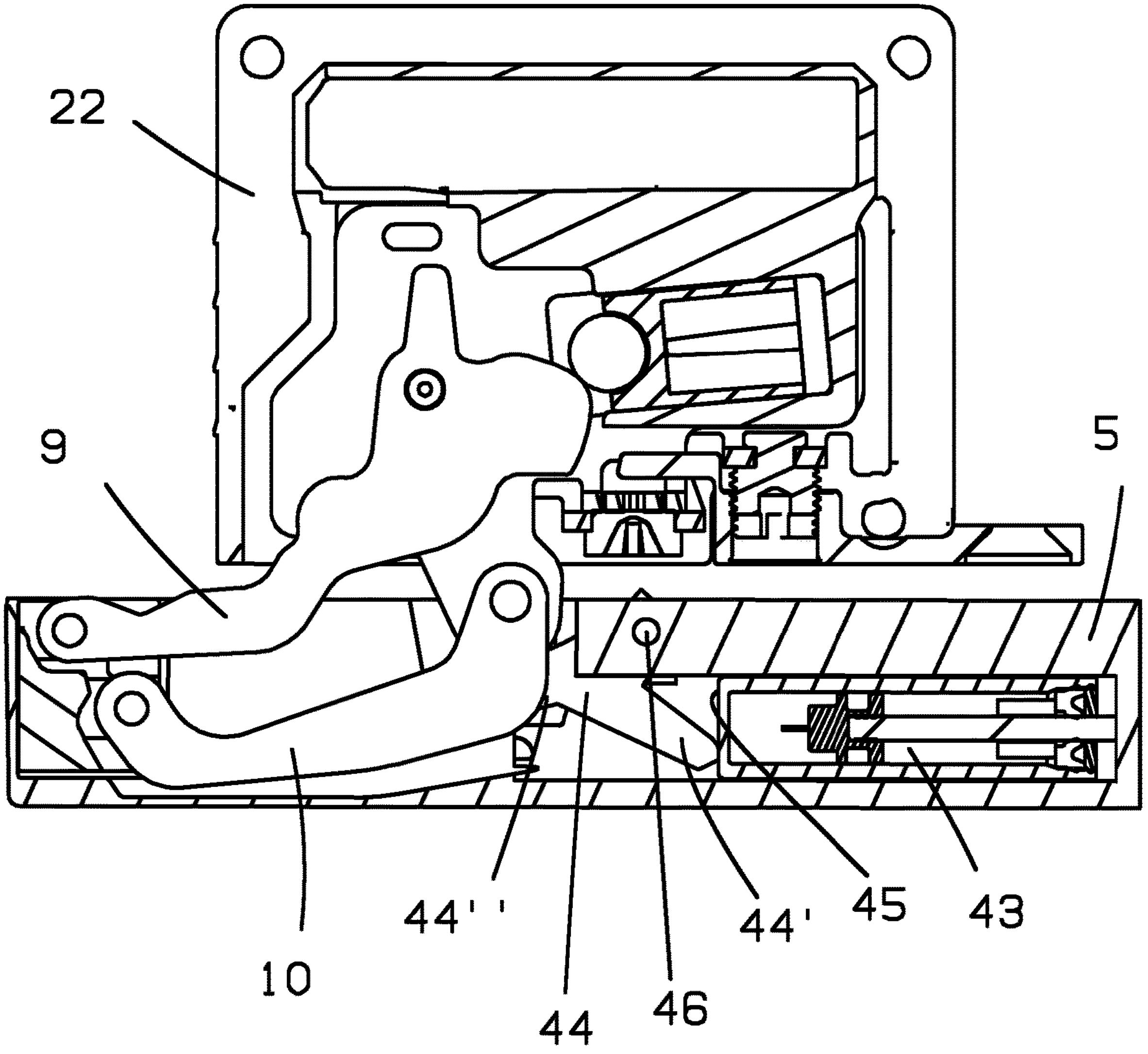
FIG. 9 is a partially sectioned top view of a hinge according to a fourth embodiment, in the closed position, in which for illustrative purposes the fixed part has been opened at the top.
Figure 10:
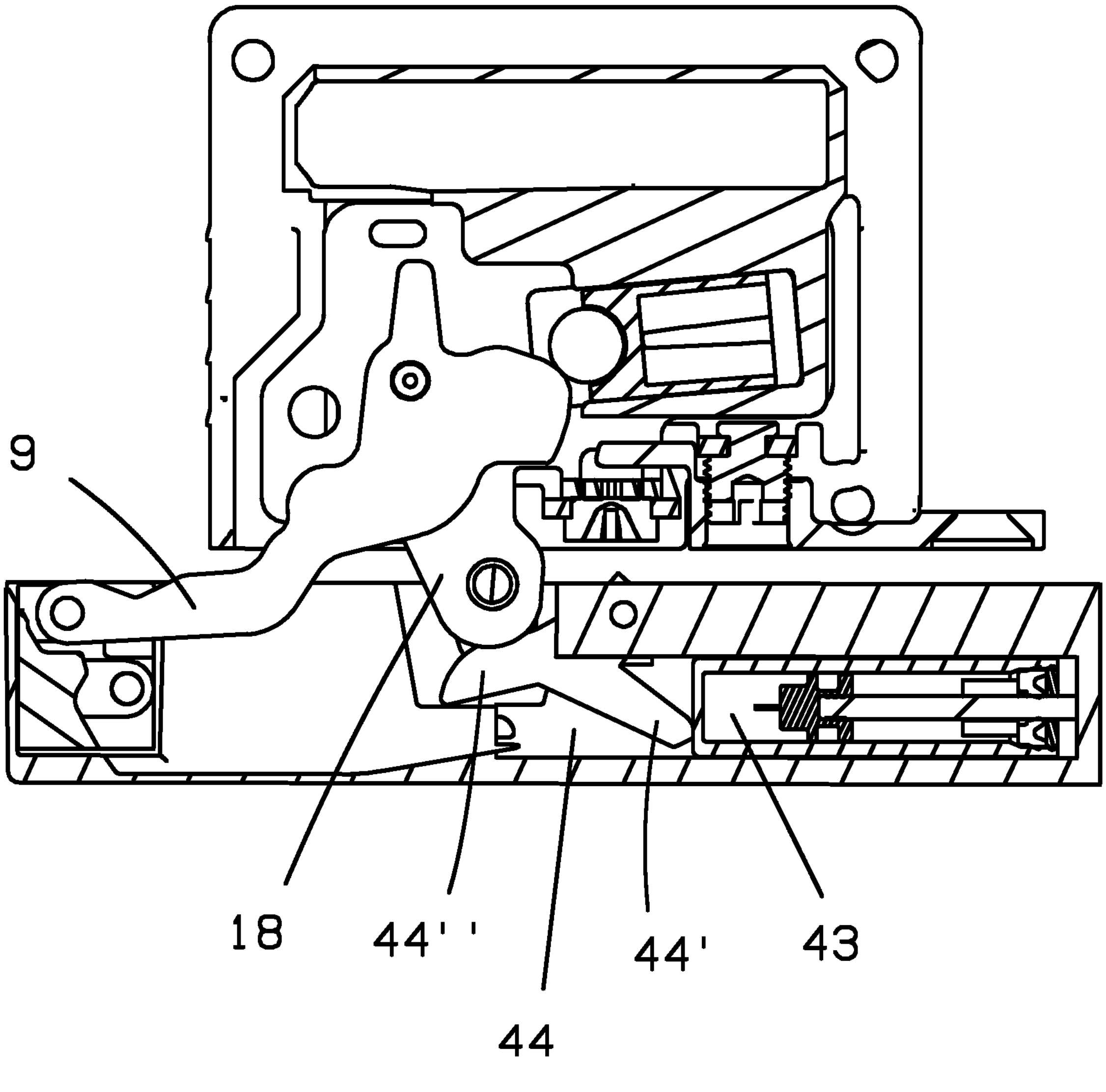
FIG. 10 is the view of FIG. 9 with one of the rockers removed for illustrative purposes.
Figure 11:
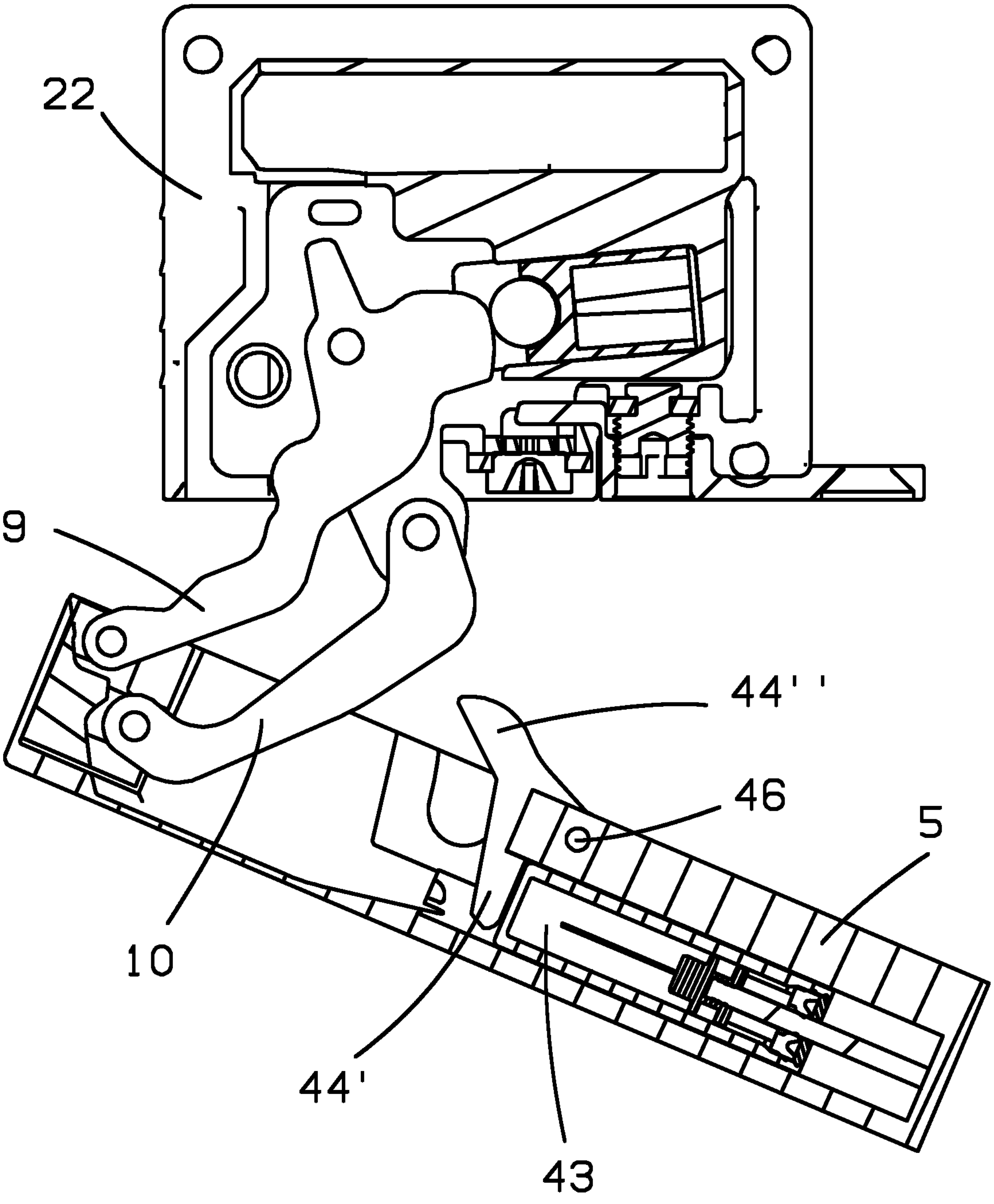
FIG. 11 is the view of FIG. 9 with the hinge in the open position.

FIGS. 9 to 11 illustrate a fourth embodiment, in which the same reference numbers of the first embodiment have been used to indicate similar or equivalent parts.

In this embodiment a damping device 43 is provided arranged in the movable part 5 of the hinge and a drive member 44 is provided, arranged and supported in a movable way in the movable part 5 of the hinge and operatively connected or operable by the fixed part 2 of the hinge.

In particular, the damper 43 is preferentially arranged in the movable part of the hinge, for example in a lateral extension of the same or inside the movable part 5 next to the rockers 9, 10, and has an end or contact surface 45 accessible for operation by the drive member 44.

The drive member 44 is preferably in the form of a lever connected swingably to the movable part 5 of the hinge by means of a pivot 46 and having a first arm 44' intended to come into contact with the end surface 45 of the damper 43 and a second arm 44" intended to come into contact with a portion of the fixed part 2, for example a protruding portion of the flat element 18 supporting the rockers 9, 10, during at least part of the closing and/or opening movement of the hinge, for example along an arc of the movement at the closed position, so as to operate the damper to dampen the closing movement of the hinge.

However, a different positioning and a different reciprocal movement between the damper 43 and the control lever 44 is not excluded.

In addition, the drive member can be operatively connected with the movement control device or act on it directly, as in the example, or indirectly through at least one intermediate transmission element.

Figure 12:
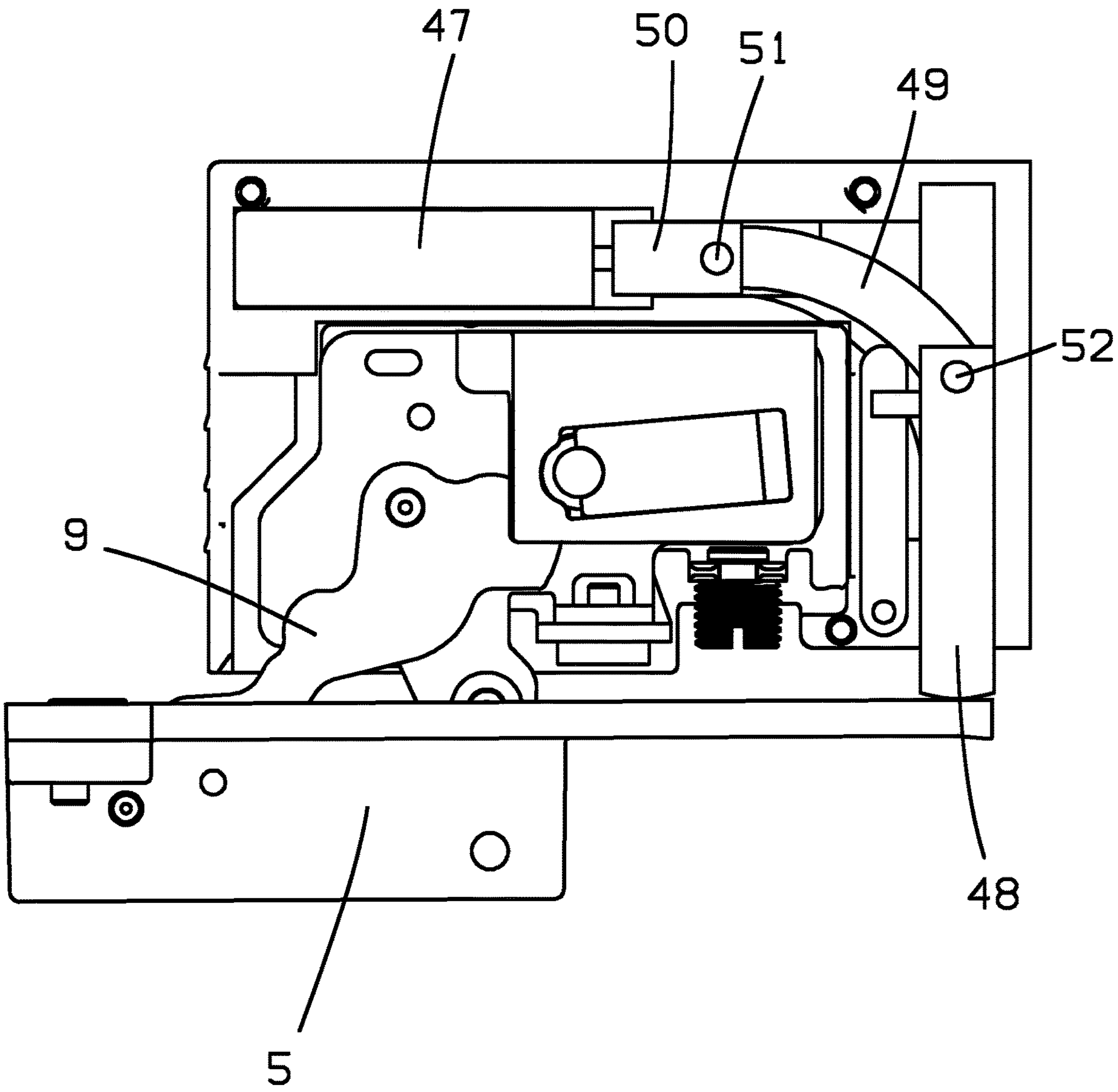
FIG. 12 is a top view of a hinge according to a fifth embodiment, in the closed position, in which for illustrative purposes the fixed part has been opened at the top.

FIGS. 12 and 13 illustrate a fifth embodiment, in which the same reference numbers of the first embodiment have been used to indicate similar or equivalent parts.

In this embodiment, a damping device 47 is provided, arranged in the fixed part 2 of the hinge and a drive member 48 is arranged and supported in a movable way in the fixed part 2 of the hinge and operatively connected or operable by the movable part 5 of the hinge.

In particular, the damper 47 is preferentially arranged in correspondence with a rear wall of the fixed part 2, while the drive member 48 is preferably in the form of a slider 48 arranged at one side of the fixed part 2 and is operatively connected to the damper 47 by a transmission mechanism, for example a transmission lever 49 connected swingably to a tip on the rod of the damper 47 through a first pivot 51 and at one end of the slider 48 through a second pivot 52.

When the hinge is open, the slider 48 protrudes from the fixed part 2 to be pushed by the movable part 5 of the hinge during at least part of the closing movement of the hinge, for example along an arc of the movement at the closing position, so as to activate the damper to dampen the closing movement of the hinge.

However, a different positioning and a different reciprocal movement between the damper 47 and the drive member 48 is not excluded.

FIGS. 14 and 15 illustrate a sixth embodiment, in which the same reference numbers as the first embodiment have been used to indicate similar or equivalent parts.

In this embodiment, the articulation device provides only an articulation axis 54, arranged in the movable part 5 of the hinge, which connects the movable part 5 of the hinge with the fixed part 2 swingably, for example with an extension 53 of the flat element 18 of the fixed part 2.

In the illustrated exemplary embodiment, a damping device 55 is provided in the fixed part 2 of the hinge, as well as a drive member 56 supported swingably by the movable part 5 of the hinge and operatively connected to the movable part 5 itself by means of a pivot. 57.

The linear damper 55 is for example arranged at a rear side of the fixed part 2, parallel to a front surface of the fixed part 2 itself; however, a different positioning of the damper in the fixed part 2 of the hinge is not excluded.

The drive member 56 is preferably in the form of a lever 56, which as mentioned is connected swingably to the movable part 5 of the hinge, which can be operatively connected to the movement control device 55 or act on it directly or indirectly through at least one intermediate transmission element.

In this embodiment, an indirect connection or actuation by at least one intermediate transmission element is illustrated; in particular, an intermediate transmission element is provided in the form of a transmission lever 58 supported swingably in the fixed part 2 of the hinge, for example connected to the flat element 18 by means of a pivot 59, and connected to the control lever 56 by means of a pivot 60.

The transmission lever 58 has a thrust surface or cam 61 intended to come into contact with one end of the cylinder of the damper 55 or with the actuating rod of the same in order to compress the damper during at least part of the closing movement and/or opening the hinge; for example in the case of the illustrated embodiment, when the door is closed, the control lever 56, which as mentioned is connected to the movable part 5 of the hinge, causes a rotation of the transmission lever 58 in such a way as to compress the damper 55 at least during the final part of the closing movement.

Also in this case the control means for the damper are released and independent from the articulation device and it is therefore possible to configure the hinge with a single articulation axis.

The transmission lever 58 also has an actuation surface or cam 58' on which the roller 16 carried by the thrust member 15 of the elastic closing means acts.

However, a different positioning of the damping device and of the drive member, as well as a different movement and/or actuation of the drive member itself, is not excluded, for example in accordance with what is illustrated in the previous embodiments.

The illustrated embodiments are some examples of positioning and actuation of the closing/opening movement control device and of the control organ of the same; however, possible further combinations and variations of positioning and actuation of the movement control device and the drive member falling within the scope of the present invention are not excluded.

In the embodiments described above, the movement control device can also be configured as an elastic device for opening the hinge, for example in the form of a helical spring and other suitable elastic means, arranged in the same seats provided for the damping device in replacement of the same and operated by the same control elements provided for the damping device; in these embodiments, as mentioned, the elastic closing means will not be provided.

From the above it is evident that the invisible hinge according to the invention, thanks to the control means for the movement control device which, contrary to known solutions, are released and independent from the articulation device, can provide freely shaped and articulated rockers, without any shape constraint linked to the need to operate the control device.

Furthermore, these solutions for actuating the movement control device are applicable even in the case in which the hinge does not include rockers, in particular in hinges having an articulation axis as the only means of connection between the fixed part and the movable part of the hinge.

The hinge according to the invention is susceptible to modifications and variations falling within the scope of the inventive concept; furthermore the construction details can be replaced by technically equivalent elements.

The present invention also refers to a piece of furniture. Said piece of furniture, or furniture, comprises at least one horizontal wall 4 having a predefined thickness. Said horizontal wall comprises at least one seat 3 obtained in said thickness and at least open on a front side of the wall 4 itself.

Said piece of furniture also includes at least one door 7.

Said piece of furniture further comprises at least one hinge 1 as defined in any one of the previously described embodiments.

Said hinge 1 with its fixed part 2 having an essentially flat shape is received in said seat 3, and with said movable part 5 it is connected to said door 7.

The invention claimed is:

1. A hinge for furniture doors comprising:

a substantially flat-shaped fixed part conformed to be inserted in a seat provided within the thickness of a horizontal wall of a piece of furniture and open on a front side of the same wall;

a movable part connectable to a door;

an articulation device comprising at least an articulation axis;

a movement control device for controlling the closing/opening movement of the hinge; and a drive member for driving the movement control device;

wherein the fixed part and the movable part are swingably connected with each other by said articulation device;

wherein said movement control device is a damping device for damping the closing and/or the opening movement of the hinge, or is a spring opening device for opening the hinge;

wherein the movement control device is completely arranged within one of said fixed part and movable part of the hinge, and said drive member is movably supported by and operatively connected to the other of said fixed part and movable part of the hinge, said drive member cooperating with the movement control device independently from said articulation device.

2. The hinge of claim 1, characterized in that the movement control device is arranged in the fixed part of the hinge and in that the drive member is swingably supported by and operatively connected to said movable part; or wherein the movement control device is arranged in the movable part of the hinge and in that the drive member is swingably supported by and operatively connected to said fixed part.

3. The hinge of claim 1, characterized in that the drive member is operatively connected to the movement control device directly, or is operatively connected to the movement control device indirectly by at least one intermediate transmission element.

4. The hinge of claim 3, characterized in that said drive member has a portion directly connected to the movement control device.

5. The hinge of claim 3, characterized in that the drive member is operatively connected to the movement control device indirectly by at least one intermediate transmission element, and in that said at least one intermediate transmission element is conformed as a transmission lever swingably supported in the fixed part or in the movable part of the hinge and connected to said drive member.

6. The hinge of claim 5, characterized in that the transmission lever has a thrust surface or cam arranged to contact said movement control device along at least part of the closing and/or opening movement of the hinge.

7. The hinge of claim 5, wherein said transmission lever is directly connected to said drive member.

8. The hinge of claim 5, wherein said transmission lever is directly connected to said movement control device.

9. The hinge of claim 3, characterized in that the drive member is operatively connected to the movement control device indirectly by at least one intermediate transmission element, and in that said at least one transmission element is conformed as a slider sliding in the fixed part or in the movable part of the hinge and connected to the drive member, the slider having a thrust surface for acting on the movement control device along at least part of the closing and/or opening movement of the hinge.

10. The hinge of claim 1, characterized in that the movement control device comprises a damping device for damping the closing and/or opening movement of the hinge, the hinge further comprising spring means for closing the same hinge;

or wherein the movement control device comprises a spring opening device for opening the hinge;

and/or wherein the fixed part of the hinge has a flat shape extending according to a plane orthogonal to the at least one articulation axis.

11. The hinge of claim 1, characterized in that the fixed part has a box-shaped body made in one piece or made by several parts.

12. A piece of furniture comprising:

at least a horizontal wall having a predefined thickness;

said horizontal wall comprising at least a seat provided in said thickness and at least open on a front side of the same wall;

said piece of furniture further comprising at least a door;

said piece of furniture further comprising at least one hinge according to claim 1, wherein said hinge with its fixed part substantially flat shaped is fitted in said seat, and wherein its said movable part is connected to the door.

13. The hinge of claim 1, characterized in that the movement control device is arranged in the movable part of the hinge and in that the drive member is swingably supported by and operatively connected to said fixed part.

14. The hinge of claim 1, characterized in that the movement control device is arranged in the fixed part of the hinge and in that the drive member is swingably supported by and operatively connected to said movable part.

* * * * *